(12) United States Patent
Lerios et al.

(10) Patent No.: US 9,934,596 B2
(45) Date of Patent: *Apr. 3, 2018

(54) TEXTURE REPOSITORY FOR IMAGE PROCESSING APPLICATIONS

(71) Applicant: Facebook, Inc., Menlo Park, CA (US)

(72) Inventors: Apostolos Lerios, Austin, TX (US); Jennifer Leigh Dolson, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/713,854

(22) Filed: Sep. 25, 2017

(65) Prior Publication Data

US 2018/0018794 A1    Jan. 18, 2018

Related U.S. Application Data

(60) Continuation of application No. 14/920,789, filed on Oct. 22, 2015, now Pat. No. 9,824,465, which is a division of application No. 13/338,016, filed on Dec. 27, 2011, now Pat. No. 9,196,060.

(51) Int. Cl.
*G06T 11/00* (2006.01)
*G06T 1/60* (2006.01)

(52) U.S. Cl.
CPC .............. *G06T 11/001* (2013.01); *G06T 1/60* (2013.01); *G06T 2210/36* (2013.01)

(58) Field of Classification Search
CPC  G06T 11/00–11/80; G06T 15/04; G06T 1/60; G06T 2210/36
See application file for complete search history.

(56) References Cited

U.S. PATENT DOCUMENTS

| 8,019,182 | B1 | 9/2011 | Wolfram et al. |
| 2007/0157102 | A1* | 7/2007 | Hasegawa ........... G06F 3/04845 715/769 |
| 2007/0247468 | A1 | 10/2007 | Zimmer |
| 2010/0007669 | A1 | 1/2010 | Bethune et al. |
| 2011/0285739 | A1 | 11/2011 | Tsukamoto |
| 2013/0127889 | A1 | 5/2013 | Winnemoeller et al. |
| 2013/0162664 | A1 | 6/2013 | Peacock et al. |

OTHER PUBLICATIONS

Office Action for U.S. Appl. No. 13/338,016, dated Jan. 29, 2015, twenty pages.
Office Action for U.S. Appl. No. 13/338,016, dated May 22, 2014, fourteen pages.
Office Action for U.S. Appl. No. 14/920,789, dated Apr. 12, 2017, sixteen pages.

* cited by examiner

*Primary Examiner* — Daniel Hajnik
(74) *Attorney, Agent, or Firm* — Fenwick & West LLP

(57) ABSTRACT

A texture repository is provided for use with an image manipulation application. The texture repository provides a canvas to the image manipulation application for use with an image filter. The texture repository may provide an existing canvas matching the request from the image filter, or the texture repository may generate a new canvas for the request. The generated canvas may be procedurally generated to match the request, or the generated canvas may be resized from an existing canvas stored in a non-volatile storage or a cache.

20 Claims, 4 Drawing Sheets

TEXTURE REPOSITORY FOR IMAGE PROCESSING APPLICATIONS

CROSS REFERENCE TO RELATED APPLICATIONS

This application is a continuation of U.S. application Ser. No. 14/920,789, filed Oct. 22, 2015, which is a divisional of U.S. application Ser. No. 13/338,016, filed Dec. 27, 2011, now U.S. Pat. No. 9,196,060, both of which are incorporated by reference in their entirety.

BACKGROUND

This invention relates generally to image processing, and more particularly to managing textures used for image processing applications. Image processing techniques use a variety of methods for manipulating a target image. One image processing technique modifies the target image by applying a texture image to the target image. For example, to provide a "grainy" look to the target image, the image processing application selects a grainy texture and applies the grainy texture to the target image by blending the two together pixel by pixel. The textures may be applied to the entire target image, or may be applied to only a portion of the image. For example, a watermark or copyright notice is applied to a portion of the target image. An instance of the texture fixed to a particular resolution is referred to herein as a canvas.

In typical image processing systems, a canvas is stored as an image file, such as "texture1.bmp." To apply the texture to an image, the image processing system resizes the standard canvas for the texture to the resolution needed for manipulating the target image. The image resizing process can be expensive, both in memory usage and in processing power. Image processing systems implemented on a mobile device often face hardware constraints on the mobile device's processing and memory relative to other hardware.

SUMMARY

Embodiments of the invention provide for a texture repository as part of an image processing system for managing image manipulation textures. The texture repository performs various functions for providing a canvas to match the texture and resolution requested by an image manipulation application. To provide the requested canvas, the texture repository retrieves an existing texture from a cache or non-volatile storage, or the texture repository creates a matching canvas by resizing an existing canvas or by procedurally generating the matching canvas. The created canvases can be stored, either in the cache or non-volatile storage.

The texture repository provides a single interface for managing canvas interactions, which enables caching and reuse of commonly requested canvases, as well as a centralized location for managing and storing canvases to non-volatile storage. As such, the texture repository enables optimized texture handling according to the resources of the device.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

An image repository is described for providing image canvases for image processing. As used in this application, a texture is a generalized image concept. For example, a texture may be, without limitation, a grainy texture, a sepia texture, cropping texture, a fade, etc. Each image filter can use any number of individual textures. Some filters may use no textures while other filters may apply several textures to an image.

A particular instance of a texture with a defined size is a canvas. For example, a canvas with a resolution of 400×600 is distinct from a canvas with a resolution of 500×250 though both can represent different resolutions of the same texture.

Figure 1:
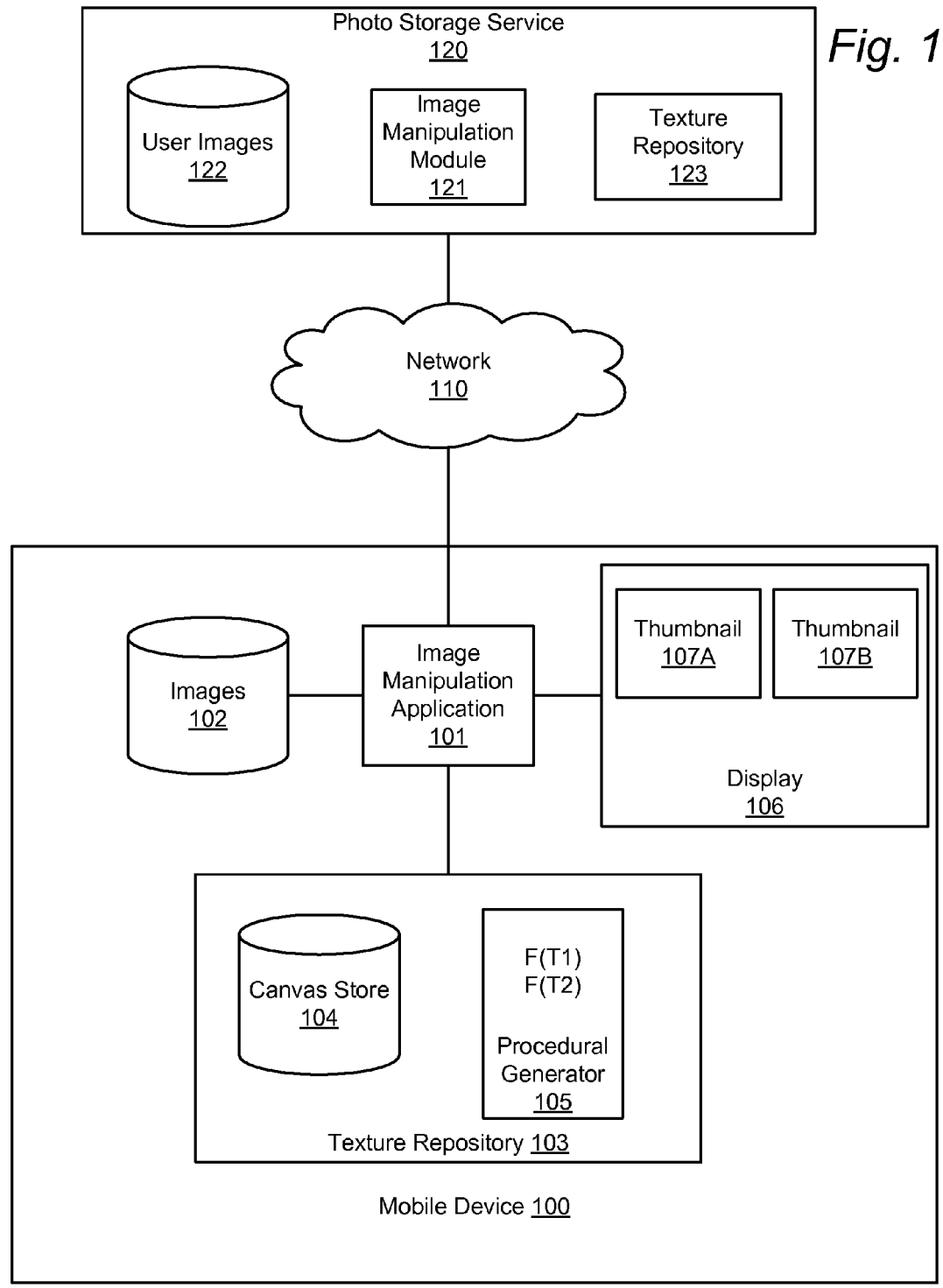
FIG. 1 shows an image manipulation application on a mobile device according to one embodiment.

Referring to FIG. 1, an image manipulation application 101 is shown on a mobile device 100 according to an embodiment. The mobile device 100 is in communication with a photo storage service 120 via a network 110. The photo storage service 120 stores photos submitted by users and can also provide the photos to other users of the service. The photo storage service 120 may be a social network or may be a photo sharing service. The photo storage service 120 may also provide storage and image manipulation processes for the photo owner.

The network 110 enables communications between the mobile device 100 and the photo storage service 120. In one embodiment, the network 110 uses standard communications technologies and/or protocols. Thus, the network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 110 can also include links to other networks, such as the Internet.

The mobile device 100 includes an image manipulation application 101, images 102, and a texture repository 103. The mobile device 100 can also include a camera for obtaining new images 102. The mobile device can be a mobile phone, a tablet computer, PDA, a network-capable handheld device, a mobile gaming system, or any other mobile device. The mobile device is capable of image manipulation through the use of an image manipulation application 101. The image manipulation application 101 requests a canvas from the texture repository 103 for use with manipulating images.

The texture repository 103 is responsible for providing a canvas to the image manipulation application 101. The image manipulation application 101 can determine whether a canvas is necessary for an image filtering process. The image manipulation application 101 requests a particular texture at a particular resolution from the texture repository 103. That is, the image manipulation application 101 is distinct from texture manipulation, which is handled by the texture repository 103. The texture repository receives a request for a particular texture and resolution and returns a canvas to the image manipulation application 101. Though depicted here as two separate components, the image manipulation application 101 and the texture repository 103 may be implemented as a single executable, or may be more than one executable. In particular, one executing instance of the texture repository 103 may be used by several executing instances of image manipulation applications 101.

In one embodiment, the texture repository 103 includes a canvas store 104 and a procedural generator 105. The canvas store 104 includes non-volatile storage and a volatile cached memory. The canvas store 104 comprises stored canvases with a designated resolution, and may comprise several stored canvases for a particular texture. For example, a texture may be stored as both 100×100 and 200×200 resolution canvases. The procedural generator 105 is a module for running functions to generate canvases. Canvases may be procedurally generated at a designated size by the procedural generator 105 rather than retrieved from the canvas store 104.

The mobile device 100 also includes a display 106. The display 106 provides an interface to display the images 102 and the manipulated images from the image manipulation application 101. The display can also act as a user interface for user input, or user input may be provided to the mobile device by other means. In this figure, the display includes thumbnails 107A and 107B. Thumbnails 107 are shown by the display 106 to show the user a scaled version of the images 102, typically for quickly viewing several images at once or to show a preview. Thumbnails 107 may be images 102 scaled to a thumbnail size, or the thumbnails may be images 102 manipulated by the image manipulation application 101 with a filter.

In one embodiment thumbnails 107 show the user two images 102 with the same filter applied in thumbnail 107A and 107B. For example, if the image manipulation application 101 implements a sepia filter, thumbnails 107A and 107B are used to show the sepia filter on two different images. Alternatively, the thumbnails 107 can be the same image 102 filtered by different filters. This enables the user to compare different filters side-by-side to select a preferred filter for the image. If the user is determining which filter to use on the variety of images sequentially, the image manipulation application may apply a group of filters to different images close in time to one another.

After the user selects a desired thumbnail from the display 106, the image manipulation application 101 can apply the same image filter to the original image 102. The image manipulation application 101 determines the resolution for the original image 102 corresponding to the selected thumbnail 107 and the image filter with corresponding textures used for the selected thumbnail 107. The image manipulation application 101 requests a canvas from the texture repository 103 corresponding to the resolution and texture used to manipulate the full-size image. The canvas corresponding to the full-size image is applied to the full size image 102 to provide the desired filtering of the original image 102. The canvas corresponding to the full-size image is not necessarily the same resolution as the full-size image. For example, a watermark on the thumbnail 107 image may only cover a portion of the thumbnail 107. The same watermark image filter would also cover a portion of the full-size image. The filtered image can be transmitted to the photo storage service 120 for storage and display to other users of the photo storage service 120.

Alternatively, after user selection of a thumbnail 107, the image 102 corresponding to the thumbnail 107 is transmitted to the photo storage service 120 along with the image filter chosen by the user. In this alternative, the image manipulation application 101 does not need to request any canvas in addition to the thumbnail canvas from the texture repository 103 or provide the related processing. In this way, the photo storage service 120 is responsible for applying the appropriate image filter to the photo.

In one embodiment, the photo storage service 120 stores the transmitted image in a database of user images 122. The photo storage service 120 also includes an image manipulation module 121 for manipulating images and a texture repository 123, implementing image manipulation and texture repository functionality. The photo storage service 120 may receive images which have already been modified by an image filter, or it may receive unmodified images accompanied by an image filter designation. The image and image filter designation (if any) can be stored to user images 122. If the photo storage service receives an image filter designation, the image filter may be applied prior to storing the user image or the image may be stored without modification. For the images which are stored without modification, when the image is retrieved by a user, the associated image filter designation is used by the image manipulation module 121 to apply the image filter, which can include retrieving a canvas or a plurality of canvases from the texture repository 123.

When the photo storage service saves unmodified images to user images 122, a user can re-designate an image filter for the image at a later time. In this way, the photo storage service allows the user to recover the original image as well as re-designate an image filter. In addition, the texture repository 123 can be used by a plurality of users simultaneously. The texture repository 123 can cache requested canvases for reuse by other users. This is particularly useful in an embodiment where the images stored in user images 122 are limited to particular resolutions, such that the resolutions requested from the texture repository 123 are also limited.

Texture Repository

Figure 2:
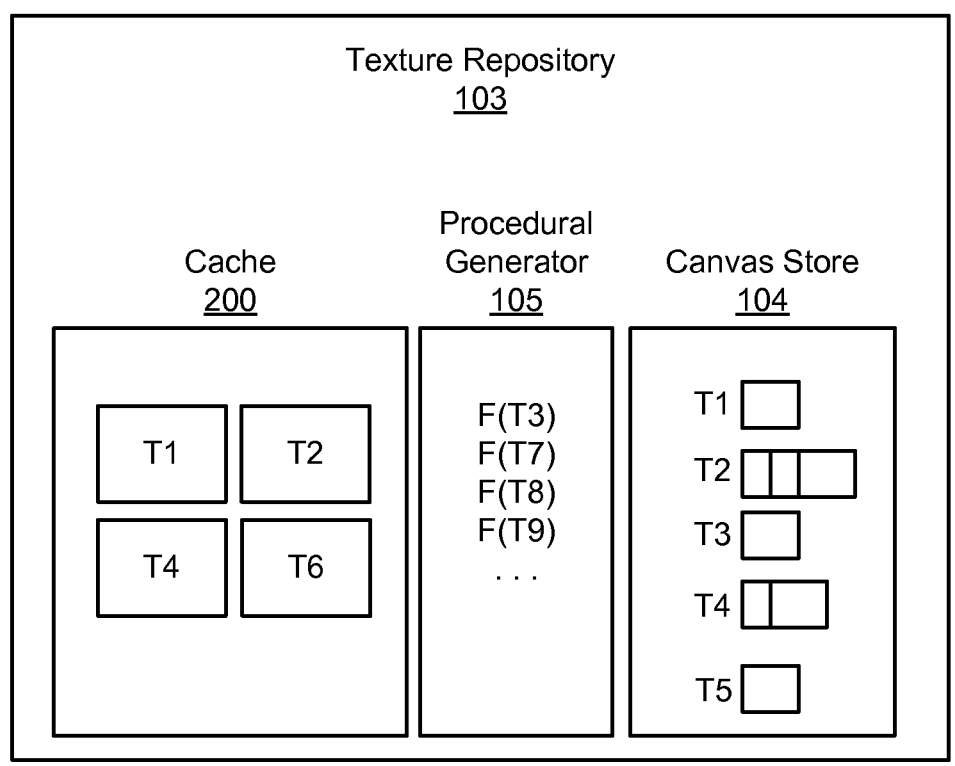
FIG. 2 shows a texture repository in more detail according to one embodiment.

The components of the texture repository 103 in one embodiment are shown in further detail on FIG. 2. Though described here and below with reference to texture repository 103, the same components may be used for texture repository 123. The texture repository 103 includes a procedural generator 105, a canvas store 104, and a cache 200. The texture repository 103 can access each of these sources for determining a canvas to provide to the image manipulation application 101. In one embodiment, the texture repository receives a request for a canvas designating a texture by an integer and a requested resolution. For example, the image manipulation application 101 can request texture number 1 at a resolution of 100×100. In response, the texture repository 103 can determine which of the sources to use for providing the requested canvas to the image manipulation application 101. For example, as shown in FIG. 2, each source may have access to different textures.

In this example, the cache 200 includes a canvas for textures 1, 2, 4, and 6. The procedural generator 105 in this figure includes functions for generating canvases for textures 3, 7, 8, and 9. As such, in this embodiment, not every texture can be created by a procedural generation function. In this figure, the canvas store 104 includes textures 1-5 in a variety of sizes. As shown, while texture 1 is present in the canvas store 104 in a single canvas, texture 2 and texture 4 are present in a plurality of sizes. In addition, a particular canvas can be obtained from several of these sources. For example, a canvas may be stored in a cache 200 and also be capable of procedural generation by the procedural generator 105. In addition, a procedurally-generated canvas may be stored in the canvas store 104.

The cache typically maintains a size according to the limitations of the mobile device. For example, certain mobile devices are limited in volatile memory, and therefore the cache space is constrained by the allocated mobile device memory. In other mobile devices, the volatile memory is more extensive and the cache size is increased to decrease delays associated with non-volatile storage accesses. The cache can be configured to preferentially retain canvases by several algorithms, such as by the most-recently-used, by the size of the canvas, or by the frequency the canvas is requested. In one embodiment, the cache preferentially retains small-size and most-recently-used canvases.

When the texture repository 103 selects a canvas from the canvas store 104, the texture repository 103 evaluates the canvases for a particular texture and determines the best canvas to use. The texture repository 103 can also resize existing canvases. For example, if the image manipulation application 101 requests a canvas with a resolution of 200×150 and the canvas store 104 contains two canvases, a first canvas with a resolution of 100×100, and a second canvas with a resolution of 250×200, the texture repository 103 selects which canvas to resize. The selected canvas can then be resized to create the requested 200×150 resolution canvas.

In one embodiment, if an exact match for the requested canvas size does not exist for a texture, the texture repository indicates that it does not have an appropriate canvas. This exact-match-required setting can be determined on a texture-by-texture basis.

Texture Repository Processing

Figure 3:
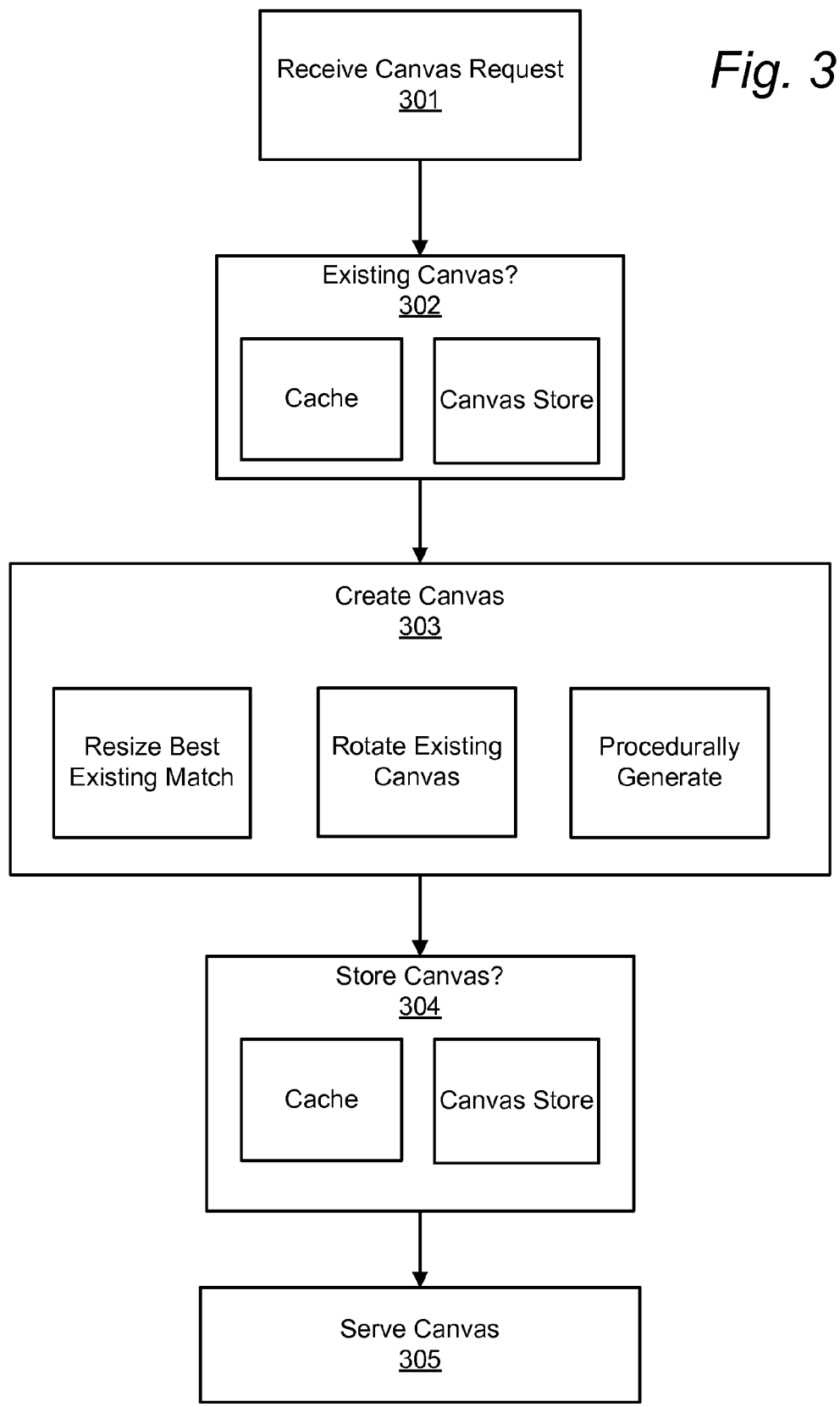
FIG. 3 shows a method for managing texture canvases according to one embodiment.

A method for managing texture canvases is provided by FIG. 3 according to one embodiment. This method can be performed by the texture repository 103. First, the texture repository 103 receives 301 a request for a canvas, which designates a desired texture and a resolution. Next, the method checks 302 for whether there is an existing canvas matching the desired texture and resolution. The existing canvas can be located in the cache 200 or in the canvas store 104. If an existing canvas exists, the existing canvas can be provided to the image manipulation application 101.

When there is no existing canvas at the requested resolution, the texture repository 103 creates the canvas 303. Creating the canvas can proceed in several different ways. First, the best-match existing canvas can be identified and resized. The best-match canvas can be located in the cache 200 or in the canvas store 104. In one embodiment, the best-match canvas can be selected from the canvas store 104 even if a canvas matching the texture exists in the cache. This situation may arise if the canvas in the canvas store 104 more closely matches the desired resolution relative to the cached canvas. For example, it could be preferable to downscale a 500×500 canvas in the canvas store 104 to a target of 400×400 rather than upscale a cached canvas with a 100×100 resolution. For certain textures, it is permissible to rotate an existing canvas, for example to yield a 200×100 canvas from an existing 100×200 canvas. For certain textures, it is also possible to combine rotation and resizing, with the intent of minimizing the amount of scaling. For example, a target of 100×200 can be obtained by directly resizing an existing 400×200 canvas or by rotating the same 400×200 canvas to yield an intermediate canvas of 200×400, which is then downscaled to 100×200. The intermediate canvas yields a stretching factor of ½ along both dimensions which may be preferable to a factor of ¼ along the first dimension and 1 along the second dimension. The different scaling factors for direct resizing can cause excessive distortion to the canvas. Certain textures are eligible for rotation while others are not, depending on the rotational-sensitivity of each texture.

In addition, the canvas can be created by procedural generation. The procedurally generated canvases may be generated anytime the canvas is needed. However, the procedural generation can be computational expensive, depending on the texture. Procedurally generated textures may also be placed in the canvas store 104. In one embodiment, for textures eligible for procedural generation (i.e. a function exists to generate the texture), prior to generating the canvas using procedural generation, the method can check whether a canvas currently exists which is adequately close to the desired resolution. If the existing canvas is adequately close, the existing canvas is resized rather than procedurally generating a new canvas.

The procedural generation may also take into account system limitations, in one embodiment. In this embodiment, the texture repository may determine metrics about the mobile device 100 to determine processing speed and memory access times. In a system with comparatively fast processing speeds and slower memory access times, the system will preferentially procedurally generate canvases rather than load the best-match canvas from memory. Alternatively, if the memory access speeds are comparatively fast and the processing speeds are slow (which may occur because of slow hardware processing speed or due to other application demands which reduce the processing power available to the image processing application), the system may preferentially load an existing canvas rather than procedurally generate it. In one embodiment, the method always procedurally generates a canvas for an eligible texture when the processing time for procedural generation is shorter than memory access times.

After creating 303 the canvas with the desired texture and resolution, the texture repository 103 determines whether to store 304 the desired canvas in the cache 200 or in the canvas store 104 (or in both). The canvas may be stored in the cache 200 or canvas store 104 for faster access. The cache is particularly useful for instances where the image manipulation application 101 repeatedly requests the same image sizes. The canvas store 104 may be used to store the canvas if the canvas was resized to a size that is not near the size of another canvas for the selected texture. For example, the canvas store 104 stores the created canvas, in one embodiment, when the created canvas is twice or half the resolution in either aspect relative to an existing canvas.

The mobile device characteristics may also be used to determine whether to store the generated canvas. For example, if it was comparatively expensive to generate the canvas, even if the canvas is similar in size to an existing canvas, the canvas is stored to reduce the processing time in the future if the canvas is used again.

The selected canvas may then be served 305 to the requesting image manipulation application 101.

Texture Repository Processing

Figure 4:
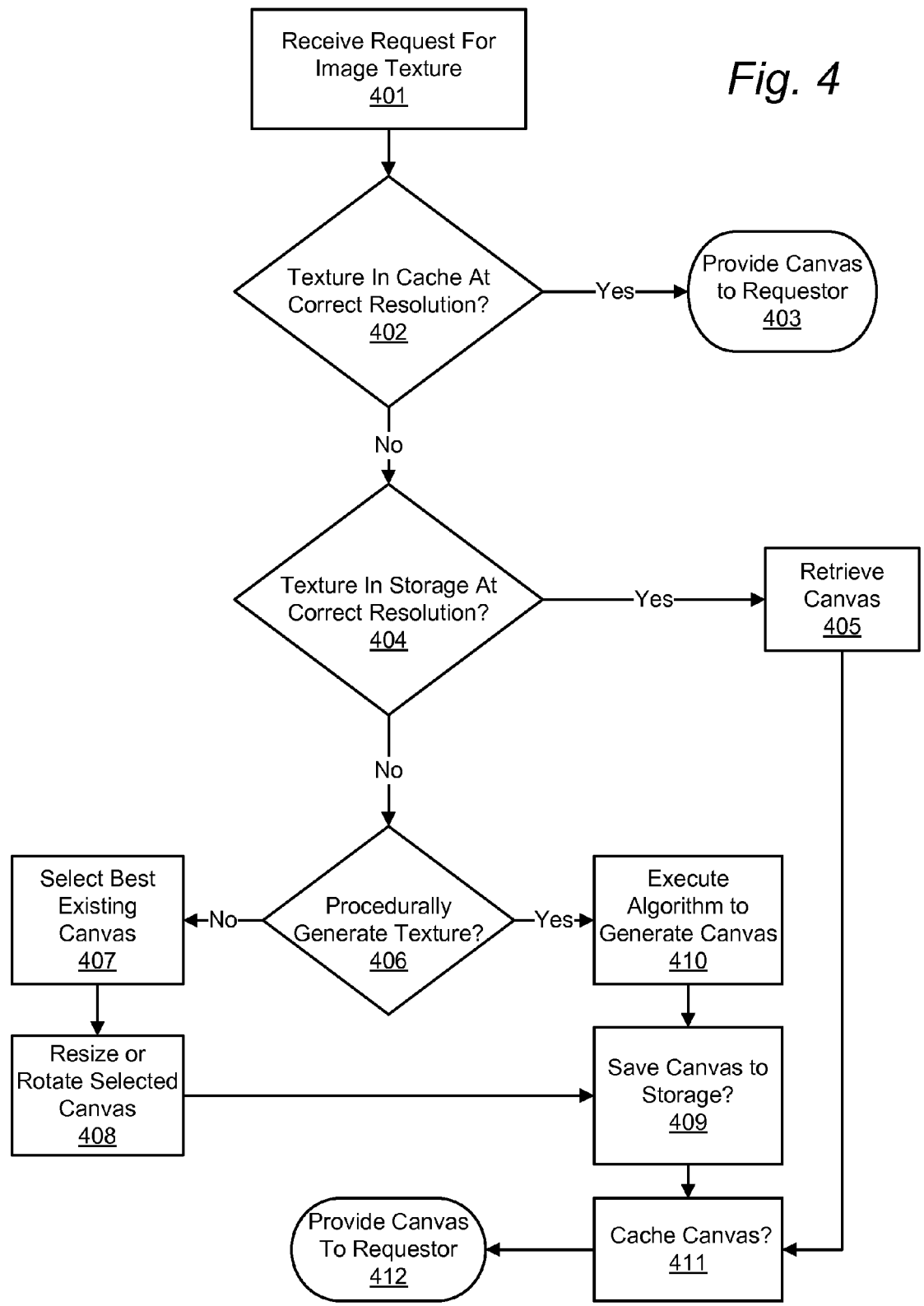
FIG. 4 shows a method for managing texture canvases according to one embodiment.

Another embodiment of a method for providing a canvas using a texture repository is shown in FIG. 4. This method can be performed, for example, by the texture repository 103. The texture repository 103 first receives 401 a request for an image texture. The texture repository 103 next determines whether the texture is in the cache at the requested resolution 402. If the texture is in the cache at the requested resolution, the cached canvas may be provided 403 to the requestor. If the texture is not in the cache at the requested resolution, the texture repository 103 determines whether the texture is in a non-volatile storage (e.g. canvas store 104). When the canvas is in the non-volatile storage at the requested resolution, the canvas is retrieved 405 and the canvas can be cached 411. The canvas may then be provided 412 to the requestor.

When the texture is not in non-volatile storage, the texture repository 103 determines how to obtain the canvas at the requested resolution. The texture repository 103 continues to determine whether to procedurally generate 406 the canvas for the texture. The determination of whether to procedurally generate eligible canvases may be made as described above. Where the canvas either cannot be procedurally generated or a determination is made not to procedurally generate the canvas, the best-existing canvas is selected 407. The best-existing canvas can be selected 407 as described above according to the existing canvas location (cache 200 or a canvas store 104) and resolution. Using the best-existing canvas, the best-existing canvas is resized or rotated 408 to create a canvas matching the requested resolution. In certain circumstances, the best-existing canvas is resized and rotated.

The requested canvas can now be saved 409 to the non-volatile storage. The determination of whether to save the canvas is made as described above which does not save every created canvas. As before, the requested canvas may also be cached 411 before being provided 412 to the requestor.

When the canvas is determined to be procedurally generated, the procedural generation algorithm is executed 410 to create the canvas. The procedurally generated canvas can be saved 409, cached 411, and provided 412 to the requestor in the same way as the resized canvas 408.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   identifying, at a computing device, a plurality of filters to be applied to an image having an image resolution, each of the filters associated with a texture;
   scaling the image to generate a scaled image having a thumbnail resolution;
   requesting a plurality of thumbnail canvases from a texture repository, each of the thumbnail canvas requests specifying the thumbnail resolution and a texture associated with one of the filters, the texture repository configured to generate a canvas with a thumbnail resolution and a texture responsive to determining that a canvas with the thumbnail resolution and the texture does not exist in a stored plurality of canvases;
   generating a set of filtered thumbnail images, each of the filtered thumbnail images generated by applying one of the filters to the scaled image, wherein applying a filter to the scaled image comprises applying one of the thumbnail canvases to the scaled image;

displaying the set of filtered thumbnail images to a user;
receiving a user selection of a filtered thumbnail image from the set of filtered thumbnail images;
identifying a filter in the plurality of filters associated with the selected filtered thumbnail image;
requesting a full-size canvas from the texture repository, the full-size canvas request specifying the image resolution and the texture associated with the identified filter; and
applying the identified filter to the image to generate a filtered image, wherein applying the identified filter to the image comprises applying the full-size canvas to the image.

2. The method of claim 1, wherein the texture repository is configured to generate a canvas with a resolution and a texture by transforming an existing canvas with a different resolution and the same texture.

3. The method of claim 1, wherein the texture repository is configured to generate a canvas with a resolution and a texture by procedurally generating a canvas with the resolution and the texture.

4. The method of claim 1, wherein the computing device is a portable computing device and wherein the texture repository is implemented on the computing device, the method further comprising:
responsive to a determination that a canvas with the thumbnail resolution and the texture does not exist in the stored plurality of canvases:
determining a processing speed and a memory access speed on the portable computing device,
determining, based on the processing speed and the memory access speed, whether to procedurally generate a canvas with the thumbnail resolution and the texture.

5. The method of claim 4, wherein determining whether to procedurally generate a canvas with the thumbnail resolution and the texture comprises:
responsive to determining a processing speed faster than a processing speed threshold, making a determination to procedurally generate the canvas.

6. The method of claim 4, wherein determining whether to procedurally generate the canvas with the thumbnail resolution and the texture comprises:
responsive to determining a processing speed slower than a processing speed threshold and determining a memory access speed faster than a memory access speed threshold, making a determination not to procedurally generate the canvas.

7. The method of claim 4, wherein determining whether to procedurally generate the canvas with the thumbnail resolution and the texture comprises:
determining, based on the processing speed, a processing time for procedural generation;
determining, based on the memory access speed, a memory access time;
responsive to the processing time being shorter than the memory access time, making a determination to procedurally generate the canvas.

8. The method of claim 1, wherein requesting the plurality of thumbnail canvases comprises:
requesting a first thumbnail canvas associated with a first filter of the plurality of filters, the first thumbnail canvas specifying the thumbnail resolution and the texture associated with the first filter; and
requesting a second thumbnail canvas associated with a second filter of the filters, the second thumbnail canvas specifying the thumbnail resolution and the texture associated with the second filter, wherein the texture associated with the second filter is different from the texture associated with the first filter.

9. The method of claim 8, wherein generating the set of filtered thumbnail images comprises:
generating a first filtered thumbnail image, the generation of the first filtered thumbnail image comprising applying the first thumbnail canvas to the scaled image; and
generating a second filtered thumbnail image, the generation of the second filtered thumbnail image comprising applying the second thumbnail canvas to the scaled image.

10. The method of claim 1, wherein a filter of the plurality of filters is associated with a first texture and is further associated with a second texture, wherein the second texture is different from the first texture.

11. The method of claim 10, wherein requesting the plurality of thumbnail canvases comprises:
requesting a first thumbnail canvas associated with the filter, the first thumbnail canvas specifying the thumbnail resolution and the first texture; and
requesting a second thumbnail canvas associated with the second filter, the second thumbnail canvas specifying the thumbnail resolution and the second texture.

12. The method of claim 11, wherein generating the set of filtered thumbnail images comprises:
generating a filtered thumbnail image, the generation of the filtered thumbnail image comprising:
applying the first thumbnail canvas to the scaled image, and
applying the second thumbnail canvas to the scaled image.

13. A computer system comprising:
a processor configured to execute instructions; and
a non-transitory computer-readable storage medium having computer program instructions stored thereon, the computer program instructions when executed by the processor causing the processor to perform operations comprising:
identifying a plurality of filters to be applied to an image having an image resolution, each of the filters associated with a texture;
scaling the image to generate a scaled image having a thumbnail resolution;
requesting a plurality of thumbnail canvases from a texture repository, each of the thumbnail canvas requests specifying the thumbnail resolution and a texture associated with one of the filters, the texture repository configured to generate a canvas with a thumbnail resolution and a texture responsive to determining that a canvas with the thumbnail resolution and the texture does not exist in a stored plurality of canvases;
generating a set of filtered thumbnail images, each of the filtered thumbnail images generated by applying one of the filters to the scaled image, wherein applying a filter to the scaled image comprises applying one of the thumbnail canvases to the scaled image;
displaying the set of filtered thumbnail images to a user;
receiving a user selection of a filtered thumbnail image from the set of filtered thumbnail images;
identifying a filter in the plurality of filters associated with the selected filtered thumbnail image;

requesting a full-size canvas from the texture repository, the full-size canvas request specifying the image resolution and the texture associated with the identified filter; and applying the identified filter to the image to generate a filtered image, wherein applying the identified filter to the image comprises applying the full-size canvas to the image.

14. The computer system of claim 13, wherein the computer system is a portable computing device and wherein the texture repository is implemented on the computer system, the operations further comprising:

responsive to a determination that a canvas with the thumbnail resolution and the texture does not exist in the stored plurality of canvases:

determining a processing speed and a memory access speed on the portable computing device, determining, based on the processing speed and the memory access speed, whether to procedurally generate a canvas with the thumbnail resolution and the texture.

15. The computer system of claim 13, wherein requesting the plurality of thumbnail canvases comprises:

requesting a first thumbnail canvas associated with a first filter of the plurality of filters, the first thumbnail canvas specifying the thumbnail resolution and the texture associated with the first filter; and requesting a second thumbnail canvas associated with a second filter of the filters, the second thumbnail canvas specifying the thumbnail resolution and the texture associated with the second filter, wherein the texture associated with the second filter is different from the texture associated with the first filter.

16. The computer system of claim 13, wherein a filter of the plurality of filters is associated with a first texture and is further associated with a second texture, wherein the second texture is different from the first texture.

17. A non-transitory computer-readable storage medium having computer program instructions stored thereon, the computer program instructions when executed by a processor causing the processor to perform operations comprising:

identifying, at a computing device, a plurality of filters to be applied to an image having an image resolution, each of the filters associated with a texture;

scaling the image to generate a scaled image having a thumbnail resolution;

requesting a plurality of thumbnail canvases from a texture repository, each of the thumbnail canvas requests specifying the thumbnail resolution and a texture associated with one of the filters, the texture repository configured to generate a canvas with a thumbnail resolution and a texture responsive to determining that a canvas with the thumbnail resolution and the texture does not exist in a stored plurality of canvases;

generating a set of filtered thumbnail images, each of the filtered thumbnail images generated by applying one of the filters to the scaled image, wherein applying a filter to the scaled image comprises applying one of the thumbnail canvases to the scaled image;

displaying the set of filtered thumbnail images to a user;

receiving a user selection of a filtered thumbnail image from the set of filtered thumbnail images;

identifying a filter in the plurality of filters associated with the selected filtered thumbnail image;

requesting a full-size canvas from the texture repository, the full-size canvas request specifying the image resolution and the texture associated with the identified filter; and applying the identified filter to the image to generate a filtered image, wherein applying the identified filter to the image comprises applying the full-size canvas to the image.

18. The non-transitory computer-readable storage medium of claim 17, wherein the computing device is a portable computing device and wherein the texture repository is implemented on the computing device, the operations further comprising:

responsive to a determination that a canvas with the thumbnail resolution and the texture does not exist in the stored plurality of canvases:

determining a processing speed and a memory access speed on the portable computing device, determining, based on the processing speed and the memory access speed, whether to procedurally generate a canvas with the thumbnail resolution and the texture.

19. The non-transitory computer-readable storage medium of claim 17, wherein requesting the plurality of thumbnail canvases comprises:

requesting a first thumbnail canvas associated with a first filter of the plurality of filters, the first thumbnail canvas specifying the thumbnail resolution and the texture associated with the first filter; and requesting a second thumbnail canvas associated with a second filter of the filters, the second thumbnail canvas specifying the thumbnail resolution and the texture associated with the second filter, wherein the texture associated with the second filter is different from the texture associated with the first filter.

20. The non-transitory computer-readable storage medium of claim 17, wherein a filter of the plurality of filters is associated with a first texture and is further associated with a second texture, wherein the second texture is different from the first texture.

* * * * *